July 10, 1923.
W. L. READ
COUPLING HEAD
Filed April 16, 1921
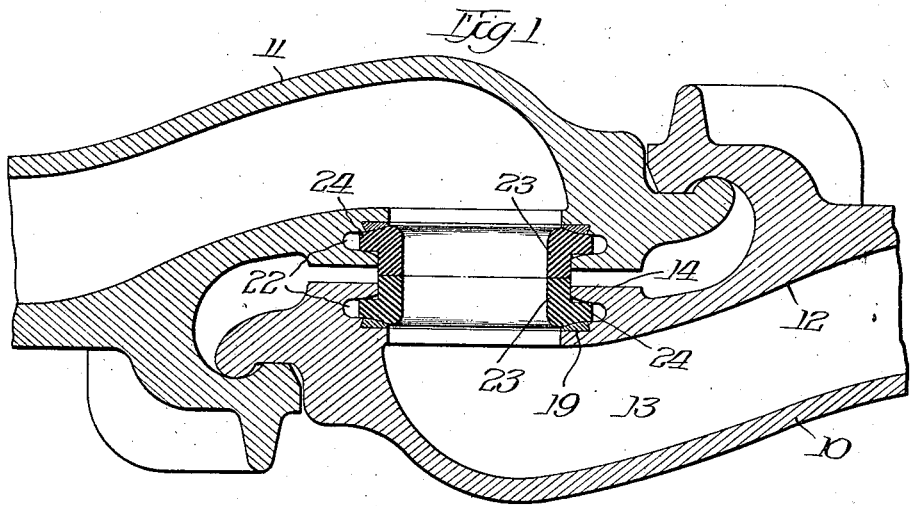
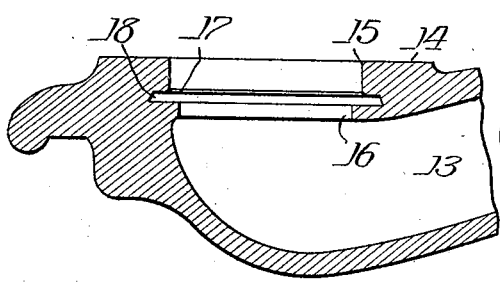
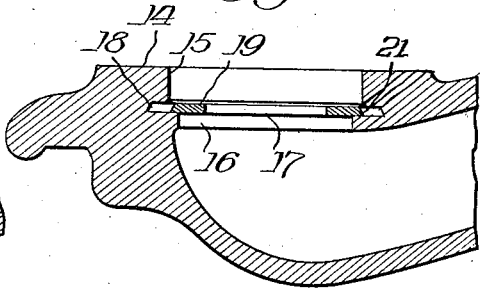
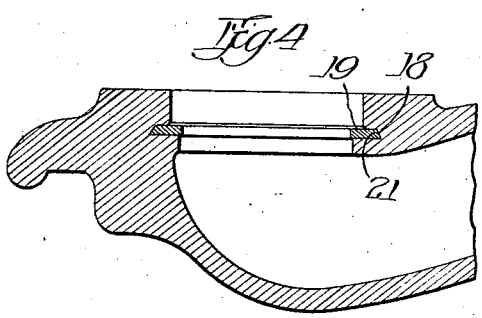
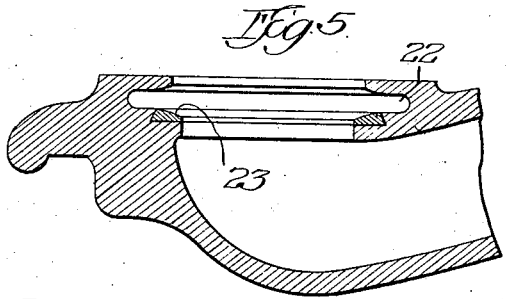
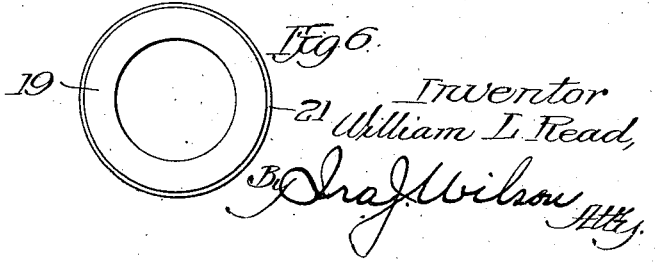
Inventor
William L. Read, Patented July 10, 1923.

1,461,225

UNITED STATES PATENT OFFICE.

WILLIAM L. READ, OF CHICAGO, ILLINOIS, ASSIGNOR OF ONE-HALF TO CHARLES F. READ, OF CHICAGO, ILLINOIS.

COUPLING HEAD.

Application filed April 16, 1921. Serial No. 461,835.

*To all whom it may concern:*

Be it known that I, WILLIAM L. READ, a citizen of the United States, residing at Chicago, in the county of Cook and State of Illinois, have invented new and useful Improvements in Coupling Heads, of which the following is a specification.

This invention relates to coupling heads for use in connecting train-line, air-hose, steam-lines, and the like, and aims to improve the construction and method of manufacture of coupling heads of this general character.

In application, Serial No. 423,346, filed November 11, 1920, there is disclosed a coupling head in which a ring of non-corrodible metal is anchored in the face of the gasket seat and surrounded both inwardly and outwardly by the metal of the body of the head. In that instance, the ring of non-corrodible metal is relatively narrow, and both the inner and outer portions of the gasket seat on both sides of the ring are formed from the metal of the body itself.

My present invention aims to improve upon that construction by providing a gasket seat in which a face of non-corrodible metal is presented which extends outwardly from the port itself instead of being spaced therefrom, so that a wider expanse of non-corrodible metal is presented to the gasket, and all liability of leakage around or beneath the metal ring is obviated.

Another object of my invention is to provide a coupling head which can be economically manufactured without injuring or weakening the body of the head, and in which the gasket seat of non-corrodible metal will be firmly and securedly anchored so that any danger of its accidental displacement from the head is obviated.

Further objects and advantages of this invention should be readily appreciated as the same becomes better understood, by reference to the following description, when considered in connection with the accompanying drawings.

Referring to the drawings:

Fig. 1 is a longitudinal sectional view of a pair of connected coupling heads embodying my invention;

Figs. 2, 3, 4 and 5 are fragmentary sectional views showing successive steps in the manufacture of the head; and Fig. 6 is a plan view of the gasket seat ring which is embodied in my improved couplings.

Referring now to the drawings more in detail, reference characters 10 and 11 indicate generally a pair of mating coupling heads, and since these heads are duplicates of each other, a detailed description of one will suffice for an understanding of my invention. The body 12 of the head is cast preferably of malleable iron, and cored to form an air port 13 extending through the head and terminating centrally of an annular, flat face 14, commonly termed the "meeting face" of the head.

In the casting operation, the port terminates at the meeting face in a mouth 15, and in spaced relation to said mouth, there is provided a shoulder 16 which projects inwardly into the port, as shown in Fig. 2.

The first operation in my improved method after the head is cast, is to provide immediately above this shoulder, an annular undercut groove 17, the plane of which is disposed at right angles to the axis of the bore at this point, and the perimeter of the groove is undercut from top to bottom to form an inclined outer wall 18, as shown. This groove may be formed with a cutting tool of a well known type, the cutting operation being common machine shop practice.

After the head has been provided with the groove 17, a flat metal ring of brass or other non-corrodible material is inserted through the mouth 15 and deposited upon the shoulder 16 in alignment with the groove 17, as is shown in Fig. 3.

This ring, indicated by reference character 19, has its outer perimeter inclined or tapered, as indicated at 21, (Figs. 3 and 6) the overall diameter of the ring being slightly less than the diameter of the port mouth so that the ring may be dropped into position on the shoulder 16.

An expanding tool is then inserted through the mouth into the ring, and by manipulation of this expanding tool, the ring is expanded into the groove 17 until its tapered or inclined outer face snugly engages the tapered or undercut wall 18 of the groove 17 so that the ring is firmly anchored in this groove, as shown in Fig. 4. A tapered tool is then employed to slightly further expand the ring and ream the central opening therein until the inner edges of the ring are substantially flush with the port opening through the shoulder 16.

The head is then operated upon, or machined by a routing or recess tool, to provide the gasket groove 22 (Fig. 5) immediately above the ring, and finish the upper exposed face of the ring, as indicated at 23, thereby bringing the upper face of the ring flush with the gasket groove 22, so that it forms a smooth and uninterrupted continuation of the arc on which the bottom of the groove is formed. The ring therefore, forms on its upper face, a continuation of the groove 22, and at its inner edges, a continuation of the port through the shoulder 16.

A rubber gasket 23, having an annular flange 24, is then seated in the groove 22, the upper face of this gasket being designed to project beyond the meeting face 14 of the head so that when two heads are coupled together, as shown in Fig. 1, these gaskets are compressed, thereby forming a tight, leak-proof joint between the meeting ends of the opposed gaskets and also forcing each gasket against its seat with the requisite pressure to preclude leakage around the gasket.

It will thus be apparent that I have provided a coupling head which is equipped with a gasket seat of non-corrodible metal encircling and extending radially outwardly from the port through the head so that leakage around the seat is entirely precluded.

Water, steam, air under pressure, or other fluids which may pass through or collect in the heads, tend to cause pitting or corroding of the cast metal which forms the body of the head, but the non-corrodible ring 19, which forms the gasket seat immediately surrounding the bore is not affected by these fluids, and serves therefore, to insure and maintain a smooth, permanent gasket seat which effectually precludes leakage and maintains a tight joint, even after prolonged usage.

It is believed that a coupling head embodying my invention, its method of manufacture, and many of its inherent advantages will be understood and appreciated from the foregoing without further description, and it should be manifest that the structural details of the head disclosed and the method employed in its production, are both capable of considerable variation and modification, without departing from the spirit of the invention, as defined in the following claims.

I claim:

1. A coupling head, comprising a body having a port extending therethrough, and a substantially flat ring of non-corrodible material surrounding said port, the inner diameter of said ring being substantially flush with the walls of said port and the perimeter of said ring being entirely surrounded by and anchored in the metal of said body.

2. A coupling head, comprising a metal body provided with a port extending therethrough, an annular gasket seat surrounding said port within said body, said seat including a ring of non-corrodible material anchored entirely around its perimeter in the metal of said body, and having its inner edges disposed substantially flush with the walls of said port, the upper face of said ring being tapered from the outer to the inner edge thereof.

3. A coupling head, comprising a metal body provided with a port extending therethrough, a shoulder surrounding said port and having a peripheral undercut tapered wall, and a ring of non-corrodible metal seated on said shoulder and having a tapered perimeter anchored in and circumferentially surrounded by said undercut wall, the upper face of said ring being inclined from the outer to the inner edges thereof and wholly exposed from edge to edge, and the inner edges being substantially flush with the walls of said port.

4. A coupling head, comprising a metal body provided with a port extending therethrough surrounded by an annular shoulder, and a ring of non-corrodible metal seated on said shoulder with its inner edge flush with said port and surrounded by and anchored at its perimeter in the metal of the body to provide a gasket seat, the upper face of said ring being wholly exposed and inclined from edge to edge.

5. The method of making coupling heads, which consists in forming an annular groove in the body of the head at right angles to the axis of the bore extending therethrough, expanding a ring of non-corrodible metal into said groove to anchor said ring therein and dispose its inner edges substantially flush with the walls of said bore, providing an annular gasket groove above said ring, and finishing the exposed face of said ring to provide a gasket seat.

6. The method of making coupling heads, which consists in forming a horizontally opening groove in the body of the head remote from the mouth of the port therethrough, introducing a ring of non-corrodible metal through said mouth into alignment with said groove, expanding said ring into said groove to anchor the same therein, and finishing the exposed surface of said ring to provide a gasket seat.

7. The method of making coupling heads, which consists in forming a metal body provided with a port extending therethrough and surrounded by an annular shoulder, producing an annular groove in said body immediately above the shoulder, inserting a ring of non-corrodible material through the mouth of said port into alignment with said groove, expanding said ring into said groove, forming a gasket groove immediately above said ring, and finishing the exposed face of said ring to provide a gasket seat.

8. The method of making coupling heads, which consists in undercutting the walls of the port extending through the body of the head to provide an annular groove, forcing a metal ring into said groove by radial expansion, and finishing the exposed face of said ring to provide a gasket seat of non-corrodible material immediately surrounding and extending outwardly from said port.

WILLIAM L. READ.